United States Patent [19]

Becker

[11] Patent Number: 5,758,181
[45] Date of Patent: May 26, 1998

[54] METHOD AND SYSTEM FOR ACCELERATED PRESENTATION OF SEGMENTED DATA

[75] Inventor: Daniel O. Becker, Boca Raton, Fla.

[73] Assignee: International Business Machines Corporation, Armonk, N.Y.

[21] Appl. No.: 589,772

[22] Filed: Jan. 22, 1996

[51] Int. Cl.$^6$ .................................................. G06F 15/40
[52] U.S. Cl. ............................................. 395/821; 395/116
[58] Field of Search .................................. 395/800, 133, 395/141, 343, 116, 821

[56] References Cited

U.S. PATENT DOCUMENTS

| | | | |
|---|---|---|---|
| 4,862,173 | 8/1989 | Nishitani | 341/200 |
| 5,018,077 | 5/1991 | Healey | 707/509 |
| 5,046,042 | 9/1991 | Nitatori et al. | 395/880 |
| 5,099,449 | 3/1992 | Dombrosky et al. | 395/878 |
| 5,109,336 | 4/1992 | Guenther et al. | 711/171 |
| 5,274,443 | 12/1993 | Dachiku et al. | 348/415 |
| 5,289,570 | 2/1994 | Suzuki | 395/116 |
| 5,350,303 | 9/1994 | Fox et al. | 434/118 |
| 5,355,446 | 10/1994 | Maayan | 345/434 |
| 5,392,388 | 2/1995 | Gibson | 345/339 |
| 5,526,480 | 6/1996 | Gibson | 345/302 |
| 5,537,530 | 7/1996 | Edgar et al. | 345/343 |
| 5,613,909 | 3/1997 | Stelovsky | 345/302 |
| 5,615,401 | 3/1997 | Harscoet et al. | 395/681 |

*Primary Examiner*—Moustafa M. Meky
*Attorney, Agent, or Firm*—Jeffrey S. LaBaw; Brian F. Russell; Andrew J. Dillon

[57] ABSTRACT

A method and data presentation apparatus for accelerated presentation of segmented data to a user are disclosed. According to the present invention, a data set, including a plurality of data segments each delimited by a segment boundary, is provided. In response to an invocation of an accelerated presentation of the data set, data within the data set is presented to the user at a generally accelerated data rate while a preselected group of data adjacent to each segment boundary is presented at a slower data rate than the generally accelerated data rate, thereby enabling individual data segments within the data set to be distinguished during accelerated presentation. In a first preferred embodiment of the present invention, the accelerated presentation of the data set is accomplished by presenting fewer than all data within the data set. Alternatively, in a second embodiment, accelerated presentation is accomplished by decreasing the duration of presentation of each datum within the data set. In both embodiments, the generally accelerated data rate preferably increases toward a maximum data rate in response to continuation of the accelerated presentation of the data set.

29 Claims, 5 Drawing Sheets

METHOD AND SYSTEM FOR ACCELERATED PRESENTATION OF SEGMENTED DATA

BACKGROUND OF THE INVENTION

1. Technical Field

The present invention relates in general to a method and system for data presentation and in particular to a method and system for presenting segmented data. Still more particularly, the present invention relates to a method and system for accelerated presentation of segmented data which present data adjacent to segment boundaries at a generally slower data rate.

2. Description of the Related Art

Data sets containing audio, video, and other types of partitioned data may logically be viewed as a continuous data stream comprised of a number of distinct data segments. The data segments represent useful divisions within the data stream such as song, video scene, or chapter divisions, which provide convenient reference points for a user.

Data presentation devices utilized to present segmented data sets to a user frequently provide facilities which enable a user to perform an accelerated presentation of a selected portion of a segmented data set. For example, audio compact disc players and multimedia data processing systems which provide an audio compact disk player interface typically have a "scan" button, which when depressed, causes the compact disc player to play audio data stored within a compact disc at a faster than normal rate. Such accelerated presentation facilities typically present data at an accelerated, but constant rate.

Although accelerated presentation facilities enable a user to quickly traverse a data set, for example, to locate a particular chapter, song, video scene, or other data segment of interest, the user has only limited control over the accelerated presentation of data and may have difficulty in locating the data segment of interest because of the high data rate at which data is presented during the accelerated presentation. Thus, locating a data segment of interest may necessitate that the user invoke a scan of the data set, halt the scan, present the data at a normal data rate, and repeat the process until the data segment of interest is located.

Consequently, it would be desirable to provide an improved method and system for accelerated presentation of segmented data which enable a user to easily distinguish individual data segments within the data set during the accelerated presentation.

SUMMARY OF THE INVENTION

It is therefore one object of the present invention to provide an improved method and system for data presentation.

It is another object of the present invention to provide an improved method and system for presentation of segmented data.

It is yet another object of the present invention to provide an improved method and system for accelerated presentation of segmented data which present data adjacent to segment boundaries at a generally slower data rate.

The foregoing objects are achieved as is now described. A method and data presentation apparatus for accelerated presentation of segmented data to a user are disclosed. According to the present invention, a data set, including a plurality of data segments each delimited by a segment boundary, is provided. In response to an invocation of an accelerated presentation of the data set, data within the data set is presented to the user at a generally accelerated data rate while a preselected group of data adjacent to each segment boundary is presented at a slower data rate than the generally accelerated data rate, thereby enabling individual data segments within the data set to be distinguished during accelerated presentation. In a first preferred embodiment of the present invention, the accelerated presentation of the data set is accomplished by presenting fewer than all data within the data set. Alternatively, in a second embodiment, accelerated presentation is accomplished by decreasing the duration of presentation of each datum within the data set. In both embodiments, the generally accelerated data rate preferably increases toward a maximum data rate in response to continuation of the accelerated presentation of the data set.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
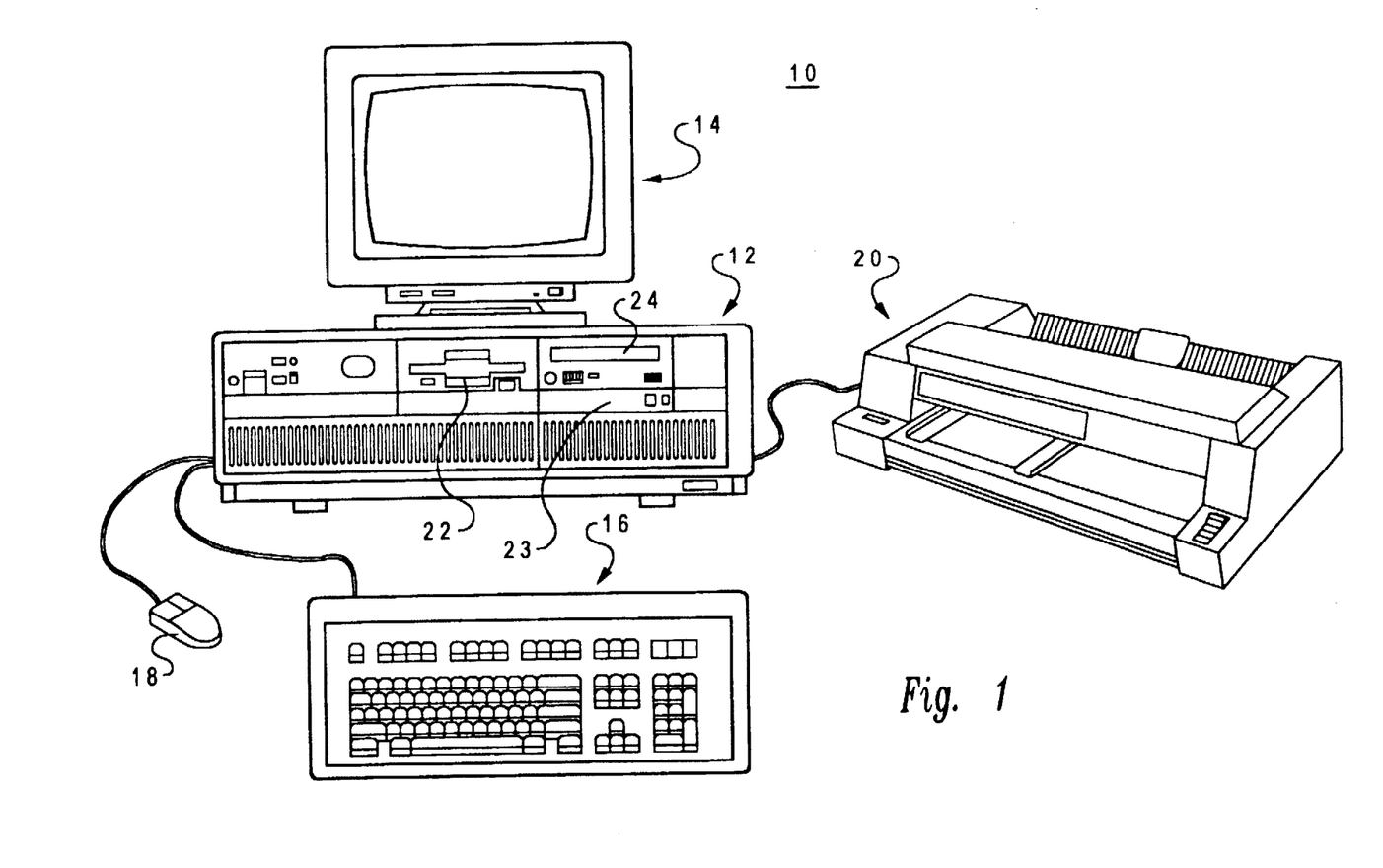
FIG. 1 illustrates a preferred embodiment of a data processing system which may be utilized to implement the method and system of the present invention.

With reference now to the figures and in particular with reference to FIG. 1, there is illustrated a preferred embodiment of a data processing system which may be utilized to implement the method of the present invention. As illustrated, data processing system 10 includes system unit 12, display device 14, keyboard 16, mouse 18, and printer 20. As is well-known in the art, system unit 12 receives data for processing from input devices such as keyboard 16, mouse 18, or local area networking interfaces (not illustrated). Mouse 18 is preferably utilized in conjunction with a graphical user interface (GUI) in which hardware and software system objects, including data processing system components and application programs, are controlled through the selection and manipulation of associated graphical objects displayed within display device 14. Although data processing system 10 is illustrated with mouse 18, those skilled in the art will recognize that other graphical pointing devices, such as a graphics tablet, joystick, or the IBM TrackPoint™, can also be utilized. Data processing system 10 presents output data to a user via display device 14, stereo speakers (not illustrated), and printer 20. To support storage and retrieval of data, system unit 12 further includes diskette drive 22, hard disk drive 23, and CD-ROM drive 24, which are connected to system unit 12 in a well-known manner. Of course, those skilled in the art are aware that other conventional components can also be connected to system unit 12.

Figure 2:
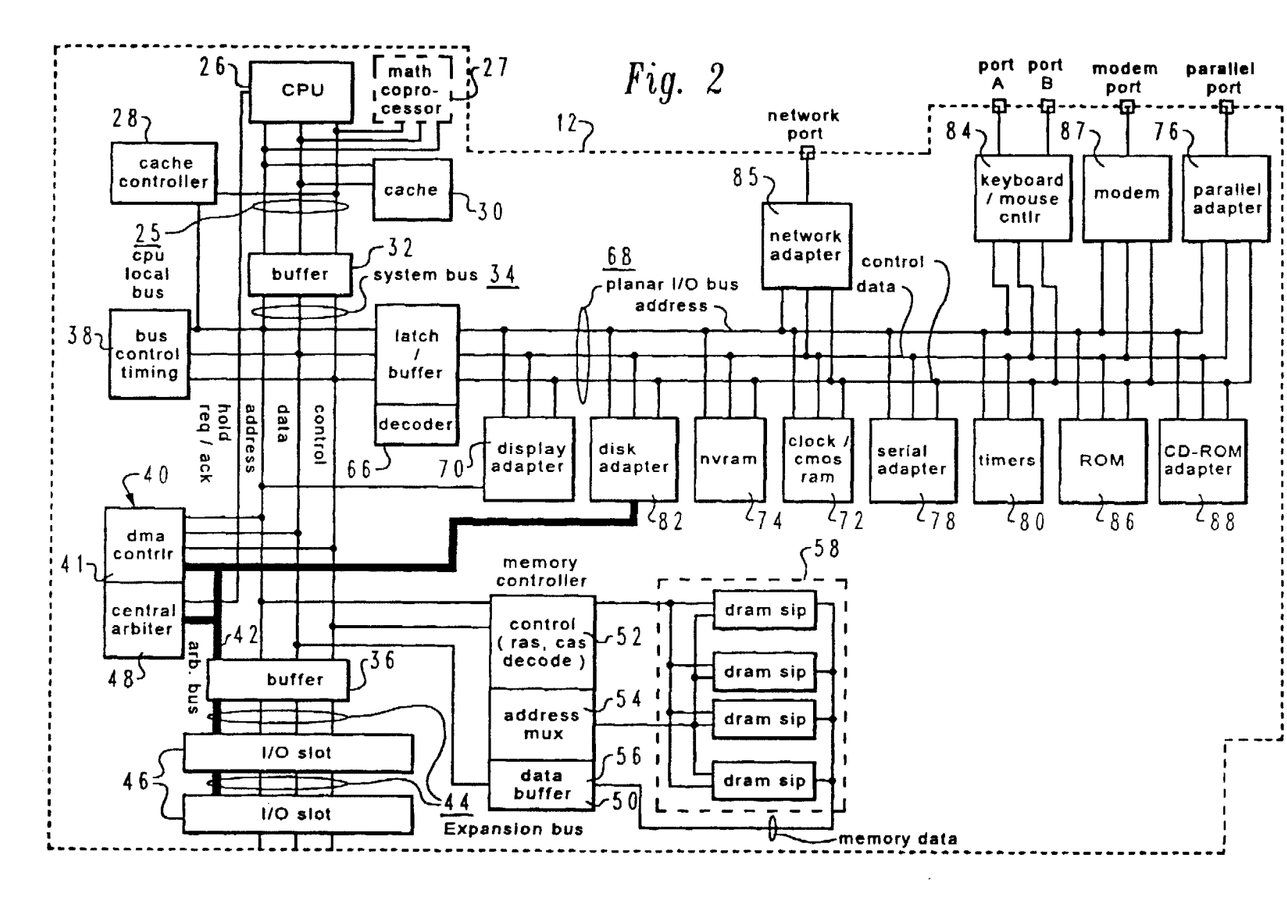
FIG. 2 depicts a preferred embodiment of the system unit of the data processing system illustrated in FIG. 1.

Referring now to FIG. 2, there is depicted a block diagram of the principal components of system unit 12 of data processing system 10. As illustrated, system unit 12 includes a central processing unit (CPU) 26 which executes software instructions. While any appropriate microprocessor can be utilized for CPU 26, CPU 26 is preferably one of the PowerPC™ line of microprocessors available from IBM Microelectronics. Alternatively, CPU 26 can be implemented as one of the 80×86 microprocessors, which are available from a number of vendors.

In addition to CPU 26, an optional math coprocessor 27, cache controller 28, and cache memory 30 are coupled to high-speed CPU local bus 25. Math coprocessor 27 is an optional processor, distinct from CPU 26, that performs numeric calculations with greater efficiency than CPU 26. Math coprocessor 27 is optional since the performance advantage provided by a math coprocessor may be achieved by enhancements to CPU 26, such as the implementation of multiple floating-point execution units. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to expansion bus 44 by control signals transmitted via arbitration control bus 42.

CPU 26 accesses data and instructions from and stores data to volatile random access memory (RAM) 58 through memory controller 50, which comprises memory control unit 50, address multiplexer 54, and data buffer 56. Memory control unit 52 generates read enable and write enable signals to facilitate storage and retrieval of data and includes address translation facilities that map virtual addresses utilized by CPU 26 into physical addresses within RAM 58. As will be appreciated by those skilled in the art, RAM 58 comprises a number of individual volatile memory modules which store segments of operating system and application software while power is supplied to data processing system 10. The software segments are partitioned into one or more virtual memory pages which each contain a uniform number of virtual memory addresses. When the execution of software requires more pages of virtual memory that can be stored within RAM 58, pages that are not currently needed are swapped with the required pages, which are stored within nonvolatile storage devices 22–24.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user mode can access only memory allocated to its virtual address space; the user mode program cannot access memory within another process's virtual address space unless memory sharing between the processes is supported and the program has the appropriate privileges for the access.

Still referring to FIG. 2, buffer 36 provides an interface between system bus 34 and an optional feature bus such as expansion bus 44. Connected to expansion bus 44 are a number of I/O slots 46 for receiving adapter cards which may be further connected to an I/O device or memory. Arbitration control bus 42 couples DMA controller 41 and central arbiter 48 to I/O slots 46 and disk adapter 82. By implementing a bus arbitration protocol, central arbiter 48 regulates access to expansion bus 44 by extension cards, controllers, and CPU 26. In addition, central arbiter 48 arbitrates for ownership of expansion bus 44 among the bus masters coupled to expansion bus 44. Bus master support allows multiprocessor configurations of expansion bus 44 to be created by the addition of bus master adapters containing a processor and its support chips.

System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, keyboard/mouse controller 84, network adapter 85, modem 87, and parallel adapter 76. Display adapter 70 translates graphics data from CPU 26 into R, G, and B video signals utilized to drive display device 14. Depending upon the operating system and application software running, the visual output may include text, graphics, animation, and multimedia video. Disk adapter 82 controls the storage of data to and the retrieval of data from hard disk drive 23 and diskette drive 22. Disk adapter 82 handles tasks such as positioning the read/write heads within drives 22 and 23 and mediating between drives 22 and 23 and CPU 26. Nonvolatile RAM 74 stores system configuration data that describes the present configuration of data processing system 10. For example, nonvolatile RAM 74 contains information that describes the capacity of hard disk drive 23 or a diskette placed within diskette drive 22, the type of display device 14, the amount of free RAM 58, and the present system configuration. These data remain stored in nonvolatile RAM 74 when power is removed from data processing system 10.

Clock 72 is utilized by application programs executed by CPU 26 for time of clay calculations. Serial adapter 78 provides a synchronous or asynchronous serial interface which enables data processing system 10 to communicate with a remote data processing system or peripheral device. Serial communication is governed by a serial communication protocol such as RS-232, RS-422, or the like. Timers 80 comprise multiple interval timers which may be utilized by application or operating system software to time one or more selected events within data processing system 10.

ROM 86 typically stores a basic input/output system (BIOS) which provides user-transparent I/O when CPU 26 is operating under the DOS operating system. BIOS also includes power on self-test (POST) diagnostic routines which perform system set up at power on. For example, POST interrogates hardware, allocates a BIOS data area (BDA), constructs an interrupt vector table to point to interrupt handling routines within ROM 86, and initializes timers 80, clock 72 and other devices within system unit 12. CD-ROM adapter 88 interfaces CD-ROM drive 24 with planar I/O bus 34 to support retrieval of data from an optical disk loaded within CD-ROM drive 24. Keyboard/mouse controller 84 interfaces system unit 12 with keyboard 16 and a pointing device, such as mouse 18.

Finally, system unit 12 includes network adapter 85, modem 87, and parallel adapter 76, which facilitate communication between data processing system 10 and peripheral devices or other data processing systems. Network adapter 85 is utilized to connect data processing system 10 to an unillustrated local area network (LAN). A LAN provides a user of data processing system 10 with a means of electronically communicating information, including software, with a remote computer or a network logical storage device. Additionally, the LAN supports distributed processing, which enables data processing system 10 to share a task with other data processing systems linked to the LAN. Modem 87 supports communication between data processing system 10 and another data processing system over a standard telephone line. For example, modem 87 may be utilized to connect data processing system 10 to an on-line information service, such as the information service provided by Prodigy Services Corporation under the service mark "PRODIGY." Such on-line service providers frequently offer software that can be downloaded into data processing system 10 via modem 87. Furthermore, through modem 87, data processing system 10 can access other sources of software, such as a server, an electronic bulletin board, and the Internet or World Wide Web. Parallel port 76 transmits printer control signals and output data to printer 20 through a parallel port.

As will be described in detail below, aspects of the present invention pertain to specific "method steps" implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non writable storage media (e.g. read only memory devices within a computer such as ROM 86 or CD-ROM disks readable by CD-ROM drive 24); (b) information alterably stored on writable storage media (e.g., floppy disks within diskette drive 22 or hard disk drive 23); or (c) information conveyed to a computer through communication media, such as through a computer or telephone network. It should be understood, therefore, that such media, when carrying computer readable instructions that direct the method functions of the present invention, represent alternate embodiments of the present invention.

Figure 3:
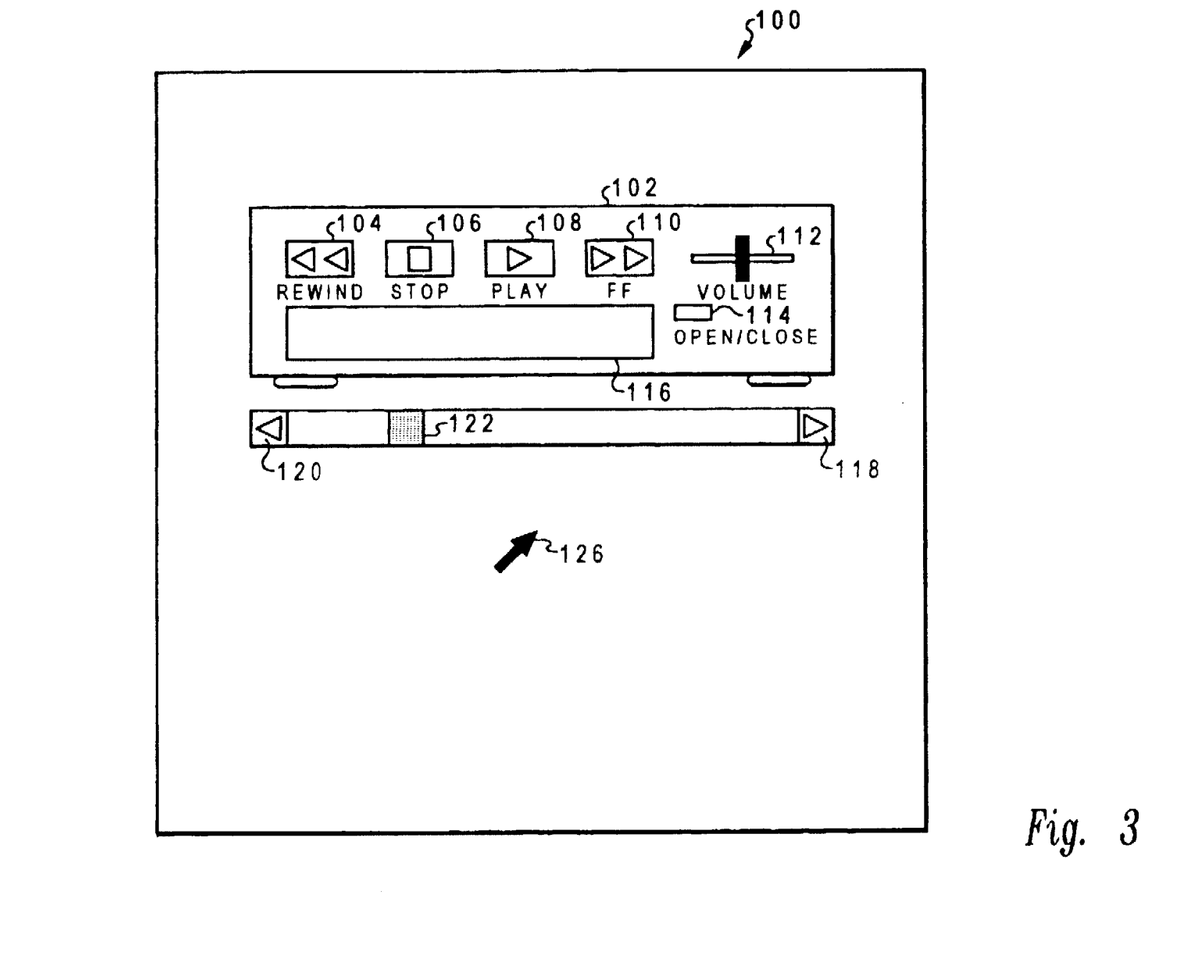
FIG. 3 illustrates a pictorial representation of an audio compact disc player interface in accordance with the method and system of the present invention which is displayed within the display device of the data processing system depicted in FIG. 1.

With reference now to FIG. 3, there is illustrated a pictorial representation of an audio compact disc (CD) player interface displayed within display device 14 of data processing system 10 in accordance with the present invention. As illustrated, audio CD player 102, scroll bar 118, and graphical pointer 126 are displayed within screen 100 of display device 14. As will be understood by those skilled in the art, audio CD player 102 is not an actual audio CD player, but is an operating system graphical user interface (GUI) utilized to control the operation of CD-ROM drive 24 of data processing system 10 when the presentation of audio data stored within a compact disc is desired. Thus, utilizing graphical pointer 126, the user may manipulate controls 104–114 to control the presentation of audio data stored within a compact disc.

To play back audio data stored within a compact disc, the user first selects open/close button 114 utilizing graphical pointer 126. In response to selection of open/close button 114, the carrying tray of CD-ROM drive 24 corresponding to tray 116 of audio CD player 102 opens. The user then inserts a selected compact disc and again selects open/close button 114 to close the carrying tray of CD-ROM drive 24. Thereafter, the user initiates and halts presentation of the audio data within the compact disc by selecting play button 108 and stop button 106, respectively, utilizing graphical pointer 126. Furthermore, in accordance with the method and system of the present invention, the user may initiate accelerated presentation of the audio data within the compact disc by selecting rewind button 104 and fast forward (FF) button 110. In addition, the user may adjust the volume at which the audio data is presented by manipulating volume control 112.

The user's current position within the data set comprising the segmented audio data stored within the compact disc is indicated by the position of scroll box 122 along the shaft of scroll bar 118. The user may select a new position within the data set by repositioning scroll box 122 utilizing the familiar drag-and-drop technique or by selecting one of scroll buttons 120. However, in contrast to the accelerated presentation invoked by the selection of fast forward (FF) button 110 and rewind button 104, selecting a new location within the data set by manipulating scroll box 122 and scroll buttons 120 does not invoke accelerated presentation of the audio data within the compact disc.

Figure 4:
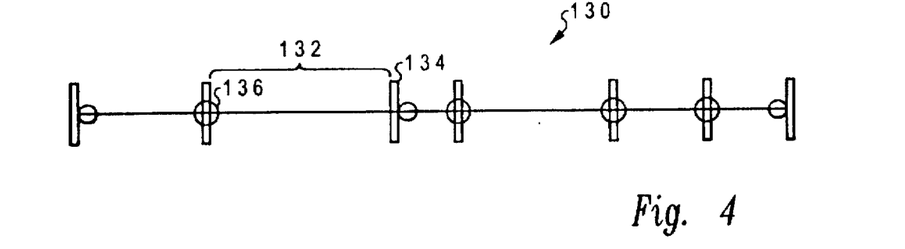
FIG. 4 depicts a conceptual diagram of a data set of segmented data.

Referring now to FIG. 4, there is depicted a conceptual diagram of a data set of segmented data. As illustrated, data set 130 is comprised of a plurality of data segments 132, which are each delimited by a pair of segment boundaries 134. As described above, each of data segments 132 represents a useful division of data set 130 and may comprise, for example, a song, video clip, chapter of a book, or other division of data set 130. Adjacent to each of segment boundaries 134 is a boundary group 136, which includes a number of individual datum. As illustrated, boundary groups 136 may encompass data on one or both sides of a segment boundary. As will be described in detail below, during accelerated presentation of data set 130, data within each of boundary groups 136 will be presented at a slower data rate than the remaining data within data set 130, thereby enabling a user to easily distinguish the beginning and ending of each of data segments 132 during accelerated presentation of data set 130. In a preferred embodiment of the present invention, boundary groups 136 are determined by the user at presentation time, for example, by prompting the user to input the number of video frames to be included within each of boundary groups 136. However, in other embodiments of the present invention, data groups 136 are indicated to the presentation device through information imbedded within data set 130.

Figure 5:
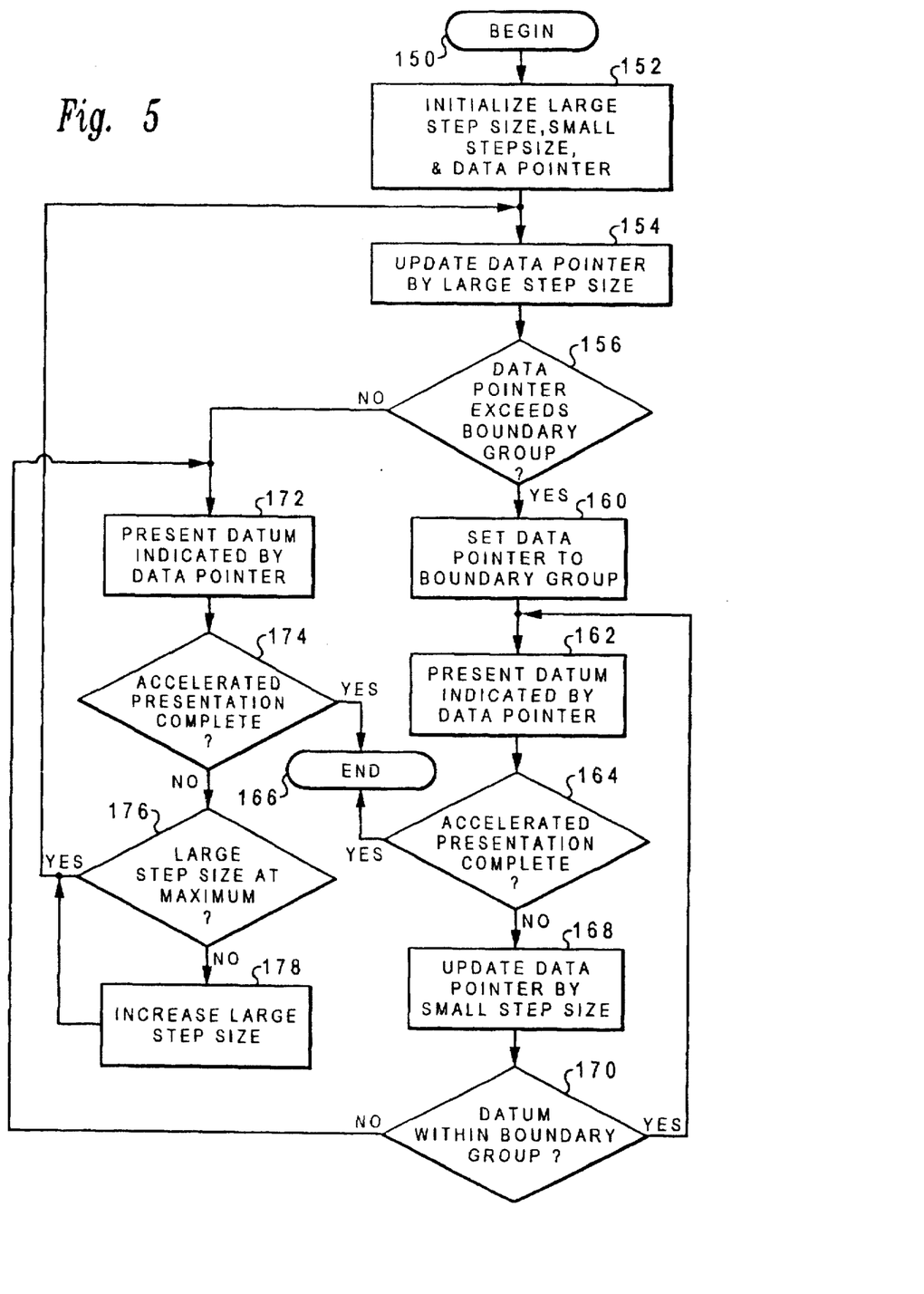
FIG. 5 is a flowchart illustrating a first preferred embodiment of a method for accelerated presentation of segmented data in accordance with the present invention.

With reference now to FIG. 5, there is illustrated a first preferred embodiment of a method for accelerated presentation of segmented data in accordance with the present invention. In the first preferred embodiment, the accelerated presentation of a data set of segmented data is accomplished by increasing the step size, the amount of data skipped between consecutively presented datum, until the step size reaches a predetermined maximum value. As illustrated, the process for accelerated presentation of a data set of segmented data begins at block 150, for example, in response to a user selecting rewind button 104 or fast forward (FF) button 110 of audio CD player 102. The process proceeds from block 150 to block 152, which depicts data processing system 10 initializing a large step size and a small step size to predetermined initial values, for example, 0.1% and 0.05% of the size of the data set stored within a compact disc, respectively. In a preferred embodiment of the present invention, the small step size is set to a single datum. At block 152, data processing system 10 also initializes a data pointer utilized to track a current position within the data set. The process then proceeds to block 154, which depicts data processing system 10 updating the data pointer by the large step size. Next, the process proceeds to block 156, which illustrates a determination of whether or not the position of the data pointer exceeds the position of a first datum within a boundary group adjacent to a segment boundary. In response to a determination that the new position of the data pointer does not exceed the position of a first datum within a boundary group, the process passes to block 172.

Returning to block 156, if a determination is made that the position of the data pointer exceeds a boundary group, the process passes from block 156 to block 160, which depicts setting the position of the data pointer to the first datum within the boundary group. Next, the process proceeds from block 160 to block 162, which illustrates data processing system 10 presenting the datum indicated by the data pointer, for example, by outputting audio data through stereo speakers. The process then passes to block 164, which depicts a determination of whether or not the accelerated presentation of the data set is complete. The determination made at block 164 may be based, for example, on whether or not the user has selected stop button 106. If a determination is made that the accelerated presentation of the data set is complete, the process passes to block 166 and terminates.

However, if a determination is made at block 164 that accelerated presentation of the data set of segmented data is to be continued, the process proceeds to block 168, which depicts updating the position of the data pointer within the data set by the small step size. The process then passes to block 170, which illustrates a determination of whether or not the datum indicated by the data pointer is within the boundary group. If not, the process passes to block 172. However, if the datum indicated by the data pointer is within the boundary group, the process returns to block 162, which has been described.

Returning to block 156, if a determination is made that the position of the data pointer does not exceed the first datum within a boundary group, the process passes to block 172, which illustrates data processing system 10 presenting the datum indicated by the data pointer. The process then passes to block 176. Block 176 depicts a determination of whether or not the large step size is set to a predetermined maximum value, for example, 1.0% of the data within the data set stored within the compact disc. In response to a determination that the large step size is set to the predetermined maximum value, the process returns from block 176 to block 154 and following blocks, which illustrate the continuation of the accelerated presentation of the data set. Returning to block 176, if a determination is made that the step size is not set to the predetermined maximum value, the process passes to block 178, which depicts increasing the large step size. The process then passes to block 154 in the manner which has been described. As should thus be apparent, FIG. 5 illustrates a process for accelerated presentation of segmented data which enables a user to distinguish individual data segments within the data set by presenting data adjacent to segment boundaries at a slower data rate. That is, less data is traversed per step at segment boundaries than is traversed at other locations within the data set.

Figure 6:
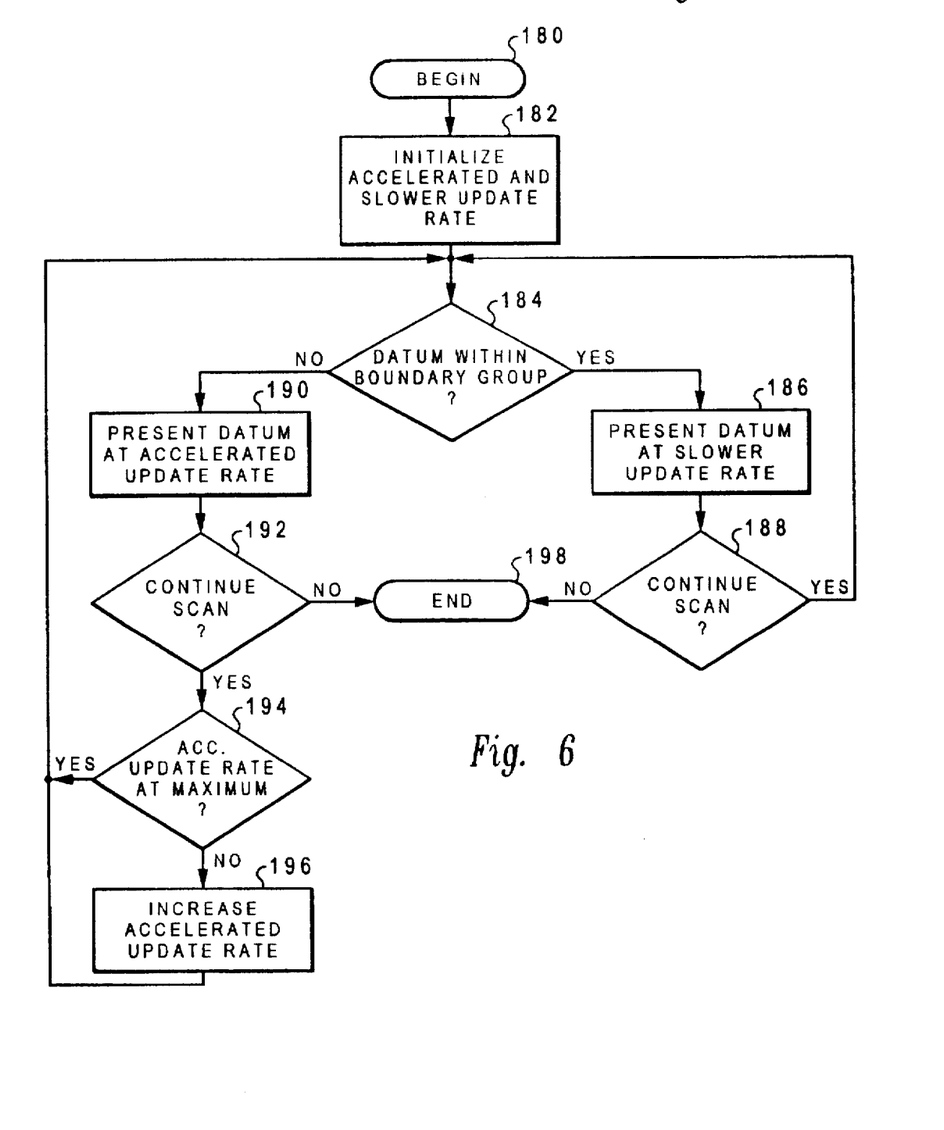
FIG. 6 is a flowchart depicting a second preferred embodiment of a method for accelerated presentation of segmented data in accordance with the present invention.

Referring now to FIG. 6, there is depicted a second preferred embodiment of a method for accelerated presentation of segmented data in accordance with the present invention. Within the process illustrated in FIG. 6, accelerated presentation of data is accomplished by increasing the update rate (decreasing the update period) until a maximum update rate is reached. As illustrated, the process begins at block 180 in response to a user initiation of an accelerated presentation of a data set and thereafter proceeds to block 182. Block 182 depicts the initialization of an accelerated update rate, that is, the duration for which data within the data set is generally presented, and a slower update rate, which is the duration for which data within boundary groups is presented. For example, the accelerated update rate and slower update rate may be initailized to 100 milliseconds and 200 milliseconds, respectively. The process proceeds from block 182 to block 184, which illustrates making a determination of whether or not the next datum within the data set is a member of a boundary group. In response to a determination that the next datum is a member of a boundary group, the process proceeds to block 186 which depicts displaying the datum at the slower update rate. Next, as depicted at block 188, a determination is made whether or not the accelerated presentation of data within the data set is to continue. If not, the process passes to block 198 and terminates.

However, in response to a determination at block 188 that the accelerated presentation of data is to be continued, the process returns to block 184, which illustrates a determination of whether or not the next datum is a member of a boundary group. If a determination is made at block 184 that the next datum is not a member of a boundary group, the process passes to block 190, which depicts displaying the datum at the accelerated update rate. Following the presentation of the datum at block 190, the process passes to block 192, which illustrates making a determination of whether or not the accelerated presentation of data within the data set is to be continued. If not, the process passes to block 198, where the process terminates. However, if the accelerated presentation of data is to be continued, the process passes from block 192 to block 194, which depicts making a determination of whether or not the accelerated update rate is set to a predetermined maximum update rate, for example, 10 milliseconds. If a determination is made that the accelerated update rate is set to the maximum value, the process returns to block 184. However, if the accelerated update rate is not yet at its maximum, the process passes to block 196, which illustrates increasing the accelerated update rate. Thereafter, the process returns to block 184 in the manner which has been described. As should thus be apparent, FIG. 6 depicts a process for accelerated presentation of segmented data which, like the process illustrated in FIG. 5, presents data adjacent segment boundaries at a relatively slower data rate than other data within the data set. However, in contrast to the process illustrated within FIG. 5, the process depicted in FIG. 6 presents data adjacent segment boundaries at a slower data rate by presenting each datum within a boundary group for a relatively long duration, rather than by decreasing the data step size.

As has been described, the present invention provides an improved method and system for accelerated presentation of segmented data which enable a user to easily distinguish between data segments. Although the present invention has been described with reference to a preferred embodiment in which the accelerated presentation of data is performed by an audio CD player interface within a data processing system, those skilled in the art will appreciate that the principles disclosed by the present invention may readily be applied to a variety of data presentation devices, such as compact disc and video players.

While the invention has been particularly shown and described with reference to a preferred embodiment, it will be understood by those skilled in the art that various changes in form and detail may be made therein without departing from the spirit and scope of the invention.

What is claimed is:

1. A method within a data presentation apparatus for accelerated presentation of segmented data to a user, said method comprising:

provided a data set including a plurality of sequentially ordered data segments, wherein each of said plurality of sequentially ordered data segments is logically delimited by a segment boundary and contains at least one datum; and in response to an invocation of an accelerated presentation of said data set, sequentially presenting data within said plurality of sequentially ordered data segments one-at-a-time at a generally accelerated data rate such that a relatively greater number of data are traversed by said data presentation apparatus per unit of time and presenting a preselected group of data adjacent to each segment boundary at a slower data rate than said generally accelerated data rate, wherein during presentation at said slower data rate a relatively fewer number of data are traversed by said data presentation apparatus per unit of time such that individual data segments within said data set may be distinguished during accelerated presentation.

2. The method for accelerated presentation of segmented data of claim 1, wherein said generally accelerated data rate increases toward a maximum data rate in response to continuation of said accelerated presentation of said data set.

3. The method for accelerated presentation of segmented data of claim 2, wherein said step of presenting data comprises:

(a) presenting to a user a first datum within a first data segment among said plurality of data segments;

(b) determining whether or not a second datum within said data set that is a step size displacement from said first datum is beyond an initial datum within said preselected group of data adjacent to a segment boundary of said first data segment;

(c) in response to a determination that said second datum is not beyond said initial datum, presenting said second datum to said user;

(d) in response to a determination that said second datum is beyond said initial datum, presenting said initial datum to said user; and (e) in response to continuation of said accelerated presentation, automatically increasing said step size and repeating steps (b)–(d).

4. The method for accelerated presentation of segmented data of claim 3, wherein said step of presenting said first datum comprises presenting each datum within said preselected group of data adjacent to said segment boundary of said first data segment.

5. The method for accelerated presentation of segmented data of claim 3, wherein said preselected group of data adjacent to said segment boundary comprises at least one datum within said first segment and at least one datum within a second segment adjacent to said first segment.

6. The method for accelerated presentation of segmented data of claim 1, wherein said data presentation apparatus is a multimedia data processing system including a display device, said step of presenting data comprising displaying video or still images within said display device.

7. The method for accelerated presentation of segmented data of claim 1, wherein said data presentation apparatus is an audio optical disc player, said step of presenting data comprising producing an audio output.

8. The method for accelerated presentation of segmented data of claim 1, wherein said data presentation apparatus includes a video player and a display device, said step of presenting data comprising displaying video images within said display device.

9. The method for accelerated presentation of segmented data of claim 1, wherein said step of presenting data within said data set at a generally accelerated data rate and presenting a preselected group of data adjacent to each segment boundary at a slower data rate than said generally accelerated data rate comprises:

presenting each datum within said data set for a generally short datum duration and presenting a preselected group of data adjacent to each segment boundary at for a longer datum duration than said generally short datum duration.

10. The method for accelerated presentation of segmented data of claim 9, wherein said generally short datum duration decreases toward a minimum datum duration in response to continuation of said accelerated presentation of said data set.

11. A data presentation apparatus for accelerated presentation of segmented data to a user, said data presentation apparatus comprising:

means for providing a data set including a plurality of sequentially ordered data segments, wherein each of said plurality of sequentially ordered data segments is logically delimited by a segment boundary and contains at least one datum; and means, responsive to an invocation of an accelerated presentation of said data set, for sequentially presenting data within said plurality of sequentially ordered data segments one-at-a-time at a generally accelerated data rate such that a relatively greater number of data are traversed by said data presentation apparatus per unit of time and for presenting a preselected group of data adjacent to each segment boundary at a slower data rate than said generally accelerated data rate, wherein during said presentation at said slower data rate a relatively fewer number of data are traversed by said data presentation apparatus per unit of time such that individual data segments within said data set may be distinguished during accelerated presentation.

12. The data presentation apparatus of claim 11, wherein said generally accelerated data rate increases toward a maximum data rate in response to continuation of said accelerated presentation of said data set.

13. The data presentation apparatus of claim 11, said means for presenting data comprising:

means for presenting to a user a selected datum within said first data segment;

means for thereafter determining whether or not a second datum within said data set that is a step size displacement from said selected datum is beyond a first datum within a preselected group of data adjacent to said segment boundary;

means, responsive to a determination that said second datum is not beyond said first datum, for presenting said second datum to said user;

means, responsive to a determination that said second datum is beyond said first datum, for presenting said first datum to said user; and means, responsive to continuation of said accelerated presentation, for automatically increasing said step size.

14. The system for accelerated presentation of segmented data of claim 13, wherein said means for presenting said first datum comprises presenting each datum within said preselected group of data adjacent to said segment boundary.

15. The data presentation apparatus of claim 13, wherein said preselected group of data adjacent to said segment boundary comprises at least one datum within said first segment and at least one datum within a second segment adjacent to said first segment.

16. The data presentation apparatus of claim 11, wherein said data presentation apparatus comprises a multimedia data processing system.

17. The data presentation apparatus of claim 11, wherein said data presentation apparatus comprises an audio optical disc player.

18. The data presentation apparatus of claim 11, wherein said data presentation apparatus comprises a video player and a display device.

19. The data presentation apparatus of claim 11, wherein said means for presenting data within said data set at a generally accelerated data rate and presenting a preselected group of data adjacent to each segment boundary at a slower data rate than said generally accelerated data rate comprises:

means for presenting each datum within said data set for a generally short datum duration and presenting a preselected group of data adjacent to each segment boundary at for a longer datum duration than said generally short datum duration.

20. The data presentation apparatus of claim 19, wherein said generally short datum duration decreases toward a minimum datum duration in response to continuation of said accelerated presentation of said data set.

21. A program product within a computer readable media for causing a data processing system to perform an accelerated presentation of segmented data to a user, said program product comprising:

instruction means for causing said data processing system to provide a data set including a plurality of sequentially ordered data segments, wherein each of said plurality of sequentially ordered data segments is logically delimited by a segment boundary and contains at least one datum; and instruction means, responsive to an invocation of an accelerated presentation of said data set, for causing said data processing system to sequentially present data within said plurality of sequentially ordered data segments one-at-a-time at a generally accelerated data rate such that a relatively greater number of data are traversed by said data processing system dear unit of time and for causing said data processing system to present a preselected group of data adjacent to each segment boundary at a slower data rate than said generally accelerated data rate, wherein during said presentation at said slower data rate a relatively fewer number of data are traversed by said data processing system per unit of time such that individual data segments within said data set may be distinguished during accelerated presentation.

22. The program product of claim 21, wherein said generally accelerated data rate increases toward a maximum data rate in response to continuation of said accelerated presentation of said data set.

23. The program product of claim 22, wherein said instruction means for causing said data processing system to present data comprises:

(a) instruction means for causing said data processing system to present to a user a first datum within a first data segment among said plurality of data segments;

(b) instruction means for causing said data processing system to determine whether or not a second datum within said data set that is a step size displacement from said first datum is beyond an initial datum within said preselected group of data adjacent to a segment boundary of said first data segment;

(c) instruction means for causing said data processing system to present said second datum to said user in response to a determination that said second datum is not beyond said initial datum;

(d) instruction means for causing said data processing system to present said initial datum to said user in response to a determination that said second datum is beyond said initial datum; and (e) instruction means for causing said data processing system to automatically increase said step size in response to continuation of said accelerated presentation.

24. The program product of claim 23, wherein said instruction means for causing said data processing system to present said first datum comprises instruction means for causing said data processing system to present each datum within said preselected group of data adjacent to said segment boundary of said first data segment.

25. The program product of claim 23, wherein said preselected group of data adjacent to said segment boundary comprises at least one datum within said first segment and at least one datum within a second segment adjacent to said first segment.

26. The program product of claim 21, wherein said data processing system is a multimedia data processing system including a display device, said step of presenting data comprising displaying video or still images within said display device.

27. The program product of claim 21, wherein said data processing system is an audio optical disc player, said instruction means for causing said data processing system to present data comprising instruction means for causing said data processing system to produce an audio output.

28. The program product of claim 21, wherein said instruction means for causing said data processing system to present data within said data set at a generally accelerated data rate and presenting a preselected group of data adjacent to each segment boundary at a slower data rate than said generally accelerated data rate comprises:

instruction means for causing said data processing system to present each datum within said data set for a generally short datum duration and presenting a preselected group of data adjacent to each segment boundary at for a longer datum duration than said generally short datum duration.

29. The program product of claim 28, wherein said generally short datum duration decreases toward a minimum datum duration in response to continuation of said accelerated presentation of said data set.

* * * * *

UNITED STATES PATENT AND TRADEMARK OFFICE
CERTIFICATE OF CORRECTION

PATENT NO. : 5,758,181
DATED : May 26, 1998
INVENTOR(S) : Becker

It is certified that error appears in the above-identified patent and that said Letters Patent is hereby corrected as shown below:

Column 11, line 55: change "dear" to --per--

Signed and Sealed this

Thirteenth Day of October 1998

Attest:

BRUCE LEHMAN

*Attesting Officer*   *Commissioner of Patents and Trademarks*